(12) United States Patent
Waibel et al.

(10) Patent No.: US 8,048,304 B2
(45) Date of Patent: Nov. 1, 2011

(54) SOLVENT EXTRACTION AND RECOVERY

(75) Inventors: Brian J. Waibel, Kenneth Square, PA (US); David J. Lawrence, Newark, DE (US); Michael Case, Bear, DE (US)

(73) Assignee: Dynasep LLC, Newark, DE (US)

( * ) Notice: Subject to any disclaimer, the term of this patent is extended or adjusted under 35 U.S.C. 154(b) by 498 days.

(21) Appl. No.: 12/331,248

(22) Filed: Dec. 9, 2008

(65) Prior Publication Data

US 2009/0166175 A1 Jul. 2, 2009

Related U.S. Application Data

(60) Provisional application No. 61/017,108, filed on Dec. 27, 2007.

(51) Int. Cl.
*B01D 11/00* (2006.01)
(52) U.S. Cl. ............... 210/634; 165/4; 210/774; 554/8; 554/11
(58) Field of Classification Search ............ 134/10; 196/14.52; 210/511, 634, 639, 774, 805, 210/806; 95/241, 251, 254–258; 554/8–21; 208/87, 96; 422/255–257; 165/4, 108
See application file for complete search history.

(56) References Cited

U.S. PATENT DOCUMENTS

| | | | |
|---|---|---|---|
| 3,477,856 A | 11/1969 | Schultz | |
| 3,969,196 A | 7/1976 | Zosel | |
| 4,218,491 A * | 8/1980 | Laws et al. | 426/600 |
| 4,246,291 A | 1/1981 | Prasad et al. | |
| 4,443,321 A | 4/1984 | Compton | |
| 4,466,923 A | 8/1984 | Friedrich | |
| 4,493,854 A | 1/1985 | Friedrich et al. | |
| 4,911,941 A | 3/1990 | Katz et al. | |
| 5,079,025 A | 1/1992 | Zobel et al. | |

(Continued)

FOREIGN PATENT DOCUMENTS

WO    WO 89/07480    8/1989

(Continued)

OTHER PUBLICATIONS

Notification of the Transmittal of the International Search Report and Written Opinion of the International Searching Authority/International Search Report dated May 27, 2009 corresponding to PCT/US2008/087649 from Korean Patent Office (thirteen pages).

(Continued)

*Primary Examiner* — Joseph Drodge
(74) *Attorney, Agent, or Firm* — Weaver Austin Villeneuve & Sampson LLP

(57) ABSTRACT

Systems and methods for improving dense gas solvent extraction of a solute and recovery of the solvent are provided. A pressure of the solvent/solute mixture obtained from an extraction chamber is increased, e.g. with a pump, thereby providing the mixture above saturation conditions. The increased pressure provides greater solubility of the solute and less solvent being vaporized in a heat exchanger. A buildup of solute in the system is reduced, thus improving system longevity. Also, process conditions of the separation process are isolated from those of the extraction process. Accordingly, the process conditions for the separating process are maintained while the process conditions of the extraction chamber vary with ambient temperature, thus saving cost and energy. This isolation also provides an ability to use, in the gas recovery cycle, a heat pump that can be used for many applications and environmental conditions while still using a conventional refrigerant.

17 Claims, 15 Drawing Sheets

U.S. PATENT DOCUMENTS

| | | | |
|---|---|---|---|
| 5,116,508 A | 5/1992 | Kumar et al. | |
| 5,138,075 A | 8/1992 | Ohgaki et al. | |
| 5,252,729 A * | 10/1993 | De Crosta et al. | 540/18 |
| 5,707,673 A * | 1/1998 | Prevost et al. | 426/417 |
| 5,938,927 A * | 8/1999 | Reich et al. | 210/634 |
| 6,106,720 A | 8/2000 | Kanel et al. | |
| 6,589,422 B2 * | 7/2003 | Low | 210/259 |
| 6,676,838 B2 * | 1/2004 | Corr et al. | 210/634 |
| 6,734,112 B2 | 5/2004 | Worm et al. | |
| 6,749,752 B2 * | 6/2004 | Trout | 210/259 |
| 7,049,465 B2 | 5/2006 | Lin | |
| 7,091,366 B2 | 8/2006 | Chordia et al. | |
| 7,384,557 B2 * | 6/2008 | Phillips et al. | 210/634 |
| 2004/0234418 A1 | 11/2004 | Laporte et al. | |
| 2005/0194313 A1 | 9/2005 | Chordia et al. | |
| 2005/0283010 A1 | 12/2005 | Chordia et al. | |
| 2006/0201342 A1 | 9/2006 | Paganessi et al. | |
| 2008/0233238 A1 | 9/2008 | Roney et al. | |
| 2008/0251454 A1 | 10/2008 | Waibel et al. | |
| 2010/0069686 A1 | 3/2010 | Waibel et al. | |

FOREIGN PATENT DOCUMENTS

| | | |
|---|---|---|
| WO | WO 91/14373 A1 | 10/1991 |
| WO | 2008/127842 | 10/2008 |
| WO | 2008/147705 | 12/2008 |
| WO | 2009/086082 | 7/2009 |

OTHER PUBLICATIONS

Sievers, Uwe and Eggers, Rudolf; "Heat recovery in supercritical fluid extraction process with separation at subcritical pressure;"1996 *Chemical Engineering and Processing*; vol. 35; pp. 239-246.

Reverchon, E. and Sesti Osseo, L.; "Comparison of Processes for the Supercritical Carbon Dioxide Extraction of Oil from Soybean Seeds;" Sep. 1994; *JAOCS*, vol. 71; No. 9; pp. 1007-1012.

* cited by examiner dimethyl ether

| Mass Flow Rate | kg/hr | 60000 | | Tcrit (deg C) | 126.85 | |
|---|---|---|---|---|---|---|
| | kg/min | 1000 | | Pcrit (bar) | 52.4 | |
| | kg/sec | 16.7 | | | | |

| | Station Description | Extract | Heat Xchange | Exp Valve | Separator Vapor | Condenser |
|---|---|---|---|---|---|---|
| | Station # | 1 | 2 | 3 | 3a | 4 |
| Pressure | bara | 10 | 10 | 8 | 8 | 8 |
| | psia | 145 | 145 | 116 | 116 | 116 |
| | psig | 130 | 130 | 101 | 101 | 101 |
| Temperature | C | 34.1 | 45.0 | 38.0 | 38.0 | 34.0 |
| | F | 93 | 113 | 100 | 100 | 93 |
| | | | | | | |
| Density | kg/L | 0.641 | 0.021 | 0.017 | 0.017 | 0.641 |
| Enthalpy | kJ/kg | 79.6 | 470.1 | 470.1 | 470.1 | 79.3 |
| Entropy | kJ/(kg K) | 0.26702 | 1.49547 | 1.52930 | 1.52930 | 0.26702 |
| Specific Heat, Cp | kJ/(kg K) | 2.454 | 1.888 | 1.782 | 1.782 | 2.457 |
| State | | Liquid | Saturated | Gas | Gas | Liquid |
| Quality | %Vapor | 0 | 98.83 | 100 | 100.00 | 0 |
| | | | | | | |
| Enthalpy Change (Delta-h) | kJ/kg | --- | 390.56 | 0.00 | 0.00 | -390.87 |
| Theoretical Power | kW | --- | 6509.3 | 0.0 | 0.0 | -6514.5 |
| | HP | --- | 8729.0 | 0.0 | 0.0 | -8735.9 |
| | BTU/hr | | 2.22E+07 | 0 | 0 | -2.22E+07 |
| | Therm/hr | | 222 | | | -222 |
| | | | | | | |
| Saturation temp., Tsat | C | 45.0 | 45.0 | 36.3 | 36.3 | 36.3 |
| Saturation pressure, Psat | bar | 10 | 10 | 8 | 8 | 8 |
| Liquid Density | kg/L | 0.6216 | 0.6216 | 0.6367 | 0.6367 | 0.6367 |
| Vapor Density | kg/L | 0.0209 | 0.0209 | 0.0168 | 0.0168 | 0.0168 |
| Liquid Enthalpy | kJ/kg | 106.1 | 106.1 | 84.7 | 84.7 | 84.7 |
| Vapor Enthalpy | kJ/kg | 474.4 | 474.4 | 467.0 | 467.0 | 467.0 |
| Heat of Vaporization | kJ/kg | 368.4 | 368.4 | 382.3 | 382.3 | 382.3 |
| Liquid Entropy | kJ/(kgK) | 0.35201 | 0.35201 | 0.28477 | 0.28477 | 0.28477 |
| Vapor Entropy | kJ/(kgK) | 1.50898 | 1.50898 | 1.51922 | 1.51922 | 1.51922 |

— 300

FIG. 3

R123
2,2-dichloro-1,1,1-trifluoroethane

| Mass Flow Rate | kg/hr | 147500 |
|---|---|---|
| | kg/min | 2458 |
| | kg/sec | 41.0 |

| | Station Description | Condenser | Expansion Valve | Evaporator | Compress |
|---|---|---|---|---|---|
| | Station # | 1 | 2 | 3 | 4 |
| Pressure | bara | 2.8 | 0.9 | 0.9 | 2.8 |
| | psia | 40.6 | 13.05 | 13.05 | 40.6 |
| | psig | 26 | -2 | -2 | 26 |
| Temperature | C | 55.0 | 24.5 | 26.0 | 59.1 |
| | F | 131 | 76 | 79 | 138 |
| | | | | | |
| Density | kg/L | 1.384 | 0.03088 | 0.00576 | 0.01710 |
| Enthalpy | kJ/kg | 256.12 | 256.12 | 397.07 | 415.23795 |
| Entropy | kJ/(kgK) | 1.1876 | 1.1931 | 1.6665 | 1.6665 |
| State | | Liquid | Sat Vap | Vapor | Vapor |
| Quality | %Vapor | 0 | 8.8 | 100.0 | 99.1239913 |
| | | | | | |
| Enthalpy Change (Delta-h) | kJ/kg | 159.1 | 0.00 | 140.95 | 18.17 |
| Theoretical Power | kW | 6519.6 | | 5775.0 | 744.6 |
| | HP | 8743 | | 7744 | 998 |
| | BTU/hr | 22265692 | | 19722881 | 2542811 |
| | 1e6BTU/hr | 22.27 | | 19.72 | 2.54 |
| | | | | | |
| Saturation temp., Tsat | C | 59.1 | 41.1 | 24.5 | 59.1 |
| Saturation pressure, Psat | bar | 2.8 | 1.6 | 0.9 | 2.8 |
| Liquid Density | kg/L | 1.372 | 1.422 | 1.464 | 1.372 |
| Vapor Density | kg/L | 0.01699 | 0.00996 | 0.00580 | 0.01699 |
| Liquid Enthalpy | kJ/(kgK) | 260.48 | 241.70 | 224.47 | 260.48 |
| Vapor Enthalpy | kJ/kg | 416.6 | 406.2 | 396.02 | 416.61 |
| Liquid Entropy | kJ/(kgK) | 1.2008 | 1.1419 | 1.0868 | 1.2008 |
| Vapor Entropy | kJ/kg | 1.6705 | 1.6653 | 1.6630 | 1.6705 |

FIG. 13

SOLVENT EXTRACTION AND RECOVERY

CLAIM OF PRIORITY

This application claims the benefit of provisional U.S. Application No. 61/017,108, filed Dec. 27, 2007, entitled "IMPROVED SOLVENT EXTRACTION AND RECOVERY", the disclosure of which is incorporated herein by reference in its entirety.

BACKGROUND

The present invention relates generally to using a solvent to extract a solute from a sample and recovering the solvent, and more specifically to providing such extraction and recovery of the solvent in a less costly, more efficient, and more durable manner.

The extraction of solutes (solids or liquids) by solvents is used in various industries. Natural substances are conventionally extracted by liquid solvents at normal pressure, as, for example, in the extraction of oil from seeds. The solute is then separated from the solvent, and the solvent is recovered for use in extracting more solute.

However, there are generally problems of solvent residue in end products (solute). Additional processing steps then remove the solvent from the extracted solute. To solve this problem, previous publications discuss using supercritical carbon dioxide. However, supercritical gases require high pressures, thus requiring more energy.

A heat pump has been used to alleviate some of the costs associated with supercritical carbon dioxide systems. However, using supercritical gases require tightly controlled temperature and pressure values throughout the process, including in the extraction chamber, which can cause high design and operational costs. For example, a new system including the heat pump may need to be designed and tailored for every new application. Also, additional energy may need to be introduced into the extraction chamber, which may be a significant thermal mass and may be exposed to exterior fluctuations in ambient temperature, thus detracting the energy savings obtained by the heat pump.

Another problem identified by the present inventors is that a viscous solute may be deposited within machinery used before and during separation, which may occur when using liquid and supercritical solvents. For example, a vaporizer used just prior to a separator may experience fouling, resulting from the solute precipitating from the solvent. This can reduce operational performance, increase energy costs, and reduce the working lifetime of the machinery.

Therefore, it is desirable to have solvent extraction and recovery systems that can provide pure products without solute deposition problems, that do not require tightly controlled parameters throughout every part of the process, and that are cost and energy efficient.

BRIEF SUMMARY

Embodiments provide systems and methods for improving dense gas extraction and recovery. In one aspect, a buildup of solute (e.g. caused by a premature precipitation of the solute) in certain parts of the system is reduced, thus improving the longevity of certain parts. A pressure of the solvent/solute mixture obtained from an extraction chamber, typically at saturation conditions, is increased thereby providing the mixture above saturation conditions. The increased pressure can lead to a greater solubility of the solute in the solvent compared to the extraction conditions, which reduces an amount of solute precipitating out during a solvent's change of phase as is required for the separating process. The increased pressure can also provide a more efficient, smaller, and/or less costly means for a heat exchanger that transfers energy during part of the phase change process. Additionally, less solvent would be vaporized in the heat exchanger when an expansion valve is used to complete the phase transition compared to using lower pressures in the heat exchanger, also leading to less solute possibly precipitating out.

In another aspect, embodiments provide systems and methods for isolating process conditions of the separation process and the extraction process. In this manner, the process conditions (e.g. temperature and pressure) for the separating process can be maintained, providing efficient separation, while the process conditions of the extraction chamber can be allowed to vary with the ambient temperature. This reduces costs associated with maintaining a relatively large extraction chamber, which may be subjected to exterior environmental fluctuations, at prescribed process conditions. This isolation also provides an ability to use, in the gas recovery cycle, a heat pump that can be used for wide variety of solvents, applications, and environmental conditions while still using a conventional refrigerant.

According to one exemplary embodiment, a system for extracting a solute using a dense gas solvent and for recovering the dense gas solvent is provided. An extraction chamber receives a dense gas solvent and outputs a dense gas solvent/solute mixture. The extraction chamber operates at a first pressure. A first pump device is fluidly coupled with an output of the extraction chamber and is operable to output a pressure that is higher than the first pressure. A solvent vaporization chamber is fluidly coupled with an output of the first pump. A separator is fluidly coupled with the solvent vaporization chamber and separates the dense gas solvent from the solute. A first solvent condensation chamber fluidly is coupled with an output of the separator. A second pump device is fluidly coupled with an output of the first solvent condensation chamber and with an input of the extraction chamber. A pressure at an output of the second pump device is increased from a pressure at an input of the of the second pump device.

According to another exemplary embodiment, a method of extracting a solute using a dense gas solvent and recovering the dense gas solvent is provided. A solute is extracted from a sample in an extraction chamber using a dense gas solvent, thereby creating a solvent/solute mixture. Thermal energy is transferred to a solvent vaporization chamber containing the solvent/solute mixture. An operating pressure of the solvent vaporization chamber is maintained to be within a prescribed operating range while allowing a temperature and pressure of the solvent/solute mixture in the extraction chamber to vary with an ambient temperature. The dense gas solvent is separated from the solute. Thermal energy is transferred from a first solvent condensation chamber containing the dense gas solvent. The dense gas solvent is then sent to the extraction chamber.

According to another exemplary embodiment, a method of extracting a solute using a liquefied gas solvent and recovering the liquefied gas solvent is provided. A solute is extracted from a sample in an extraction chamber using a dense gas solvent, thereby creating a solvent/solute mixture. The solvent/solute mixture is provided to an input of a solvent vaporization chamber at temperature/pressure conditions that are above saturation conditions for the solvent. The solvent/solute mixture is heated in the solvent vaporization chamber. The heated solvent/solute mixture is then sent through an expansion device, thereby converting substantially all of the liquefied gas solvent to a gas. The gas is separated form the solute.

The gas is cooled in a first solvent condensation chamber, thereby at least partially condensing the gas. The condensed gas is then sent to the extraction chamber.

As used herein, the term "saturation conditions" refers to the temperature and pressure values at which the subject liquid undergoes a phase change to a vapor. A saturated liquid refers to matter in the liquid phase held at a given pressure or temperature such that an infinitesimally small input of heat into the liquid would cause a conversion of a portion of the liquid to the vapor phase. A saturated gas refers to matter in vapor phase held at a given pressure or temperature such that a removal of an infinitesimally small amount of heat from the vapor would cause a conversion of a portion of the vapor to the liquid phase. "Saturation temperature" refers to the temperature associated with a saturated liquid or saturated vapor held at given pressure. "Saturation pressure" refers to the pressure associated with a saturated liquid or saturated vapor held at given temperature. "Heat of vaporization" refers to the amount of energy to convert a saturated liquid to a saturated gas at a particular temperature or pressure. The term "critical point" refers to matter at its critical pressure and temperature. At the critical point, the thermodynamic properties of the matter in the liquid phase and in the vapor phase are identical and the heat of vaporization is zero. As used herein, the term "dense gas" can refer to both a matter in the supercritical state or in the liquid state. The term "supercritical fluid" means matter existing in a temperature and pressure state exceeding the critical temperature and pressure. The term "above saturation conditions" refers to matter held in a pressure state that exceeds the vapor pressure associated with the current temperature of the matter. The term a "subcooled liquid" refers to a liquid held at a temperature below the saturation temperature corresponding to the pressure at which the matter is being held.

A better understanding of the nature and advantages of the present invention may be gained with reference to the following detailed description and the accompanying drawings.

BRIEF DESCRIPTION OF THE DRAWINGS

FIG. 3 is a table 300 showing a thermodynamic analysis of a baseline process cycle for DME according to an embodiment of the present invention.

FIG. 13 is table providing the details of this thermodynamic analysis of the process cycle for R-123 in a heat pump according to an embodiment of the present invention.

DETAILED DESCRIPTION OF EXEMPLARY EMBODIMENTS

Embodiments provide systems and methods for improving dense gas extraction and recovery. In one aspect, a buildup of solute (e.g. caused by a premature precipitation of the solute) in certain parts of the system is reduced, thus improving the longevity of certain parts. A pressure of the solvent/solute mixture obtained from an extraction chamber, typically at saturation conditions, is increased thereby providing the mixture above saturation conditions. The increased pressure may be obtained by a pump between the extraction chamber and a vaporization chamber.

Additionally, systems and methods isolate process conditions of the separation process and the extraction process. This isolation may also be obtained by a pump between the extraction chamber and a vaporization chamber. In this manner, the process conditions (e.g. temperature and pressure) for the separating process can be maintained, providing efficient separation, while the process conditions of the extraction chamber can be allowed to vary, thus reducing a variety of costs as described below.

I. Solvent Extraction and Recovery System

In commercial scale processes, the quantity of process gas in use for extraction requires that a means to separate the gaseous solvent from the solute and recovery means for the gas to be implemented. It is common to separate a solute (liquid, slurry, viscous matter, or solid) from the solvent fluid by vaporizing a dense gas solvent, collecting the solute, and subsequently recovering (via condensation) the solvent. For example, one method to perform this operation is to flash the solvent to a gas, use a cyclonic separator to coalesce and collect the solute droplets and provide a disengagement of the solvent vapor phase from the solute. A condenser is then used to convert the gas from the vapor phase to the liquid phase, which is then subsequently reused in other processing operations.

In some embodiments, the dense gas is butane, propane, dimethyl ether, isobutane, pentane, ethane, carbon dioxide, iodotrifluoromethane, ammonia, nitrous oxide, fluorocarbons, or mixtures thereof. The most common gases would be butane, propane, carbon dioxide, and dimethyl ether (DME).

Figure 1:
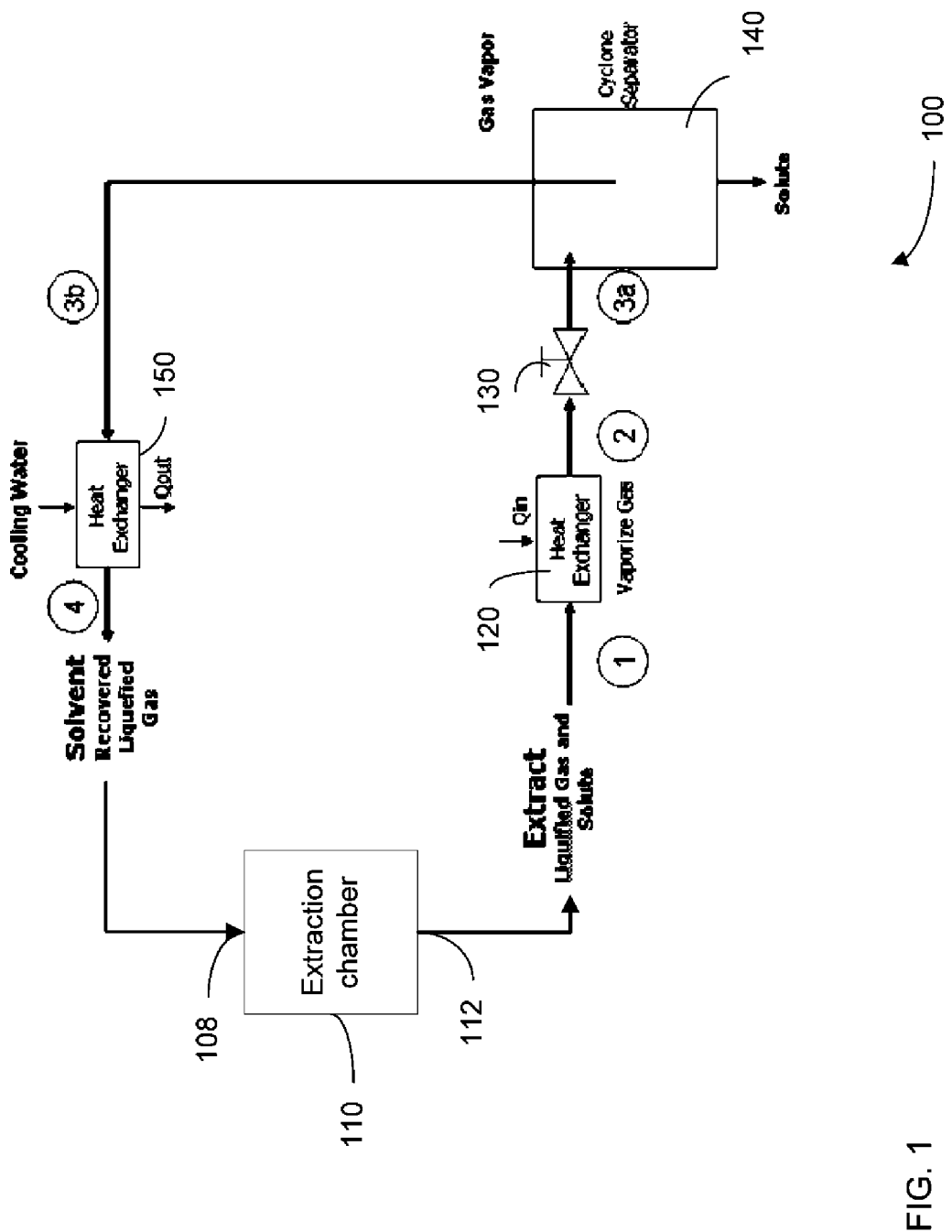
FIG. 1 shows a dense gas extraction/recovery system 100 and process cycle according to an embodiment of the present invention.

FIG. 1 shows a dense gas extraction/recovery system 100 and process cycle according to an embodiment of the present invention. This might, for example, be a process stream created in a liquefied gas extraction process. This thermodynamic cycle for a typical dense gas process is also shown in FIG. 1.

The extraction chamber 110 holds the solute along with other materials from which the solute is to be extracted. The dense gas solvent is inserted at a first input 108. The solvent/solute mixture then leaves the extraction chamber 110 at an output 112 and is sent to a vaporizing heat exchanger 120, also termed a solvent vaporization chamber.

Via the heat exchanger 120, the transition from state 1 to state 2 is used to raise the enthalpy of the process stream. An energy Qin is transferred into the heat exchanger 120 to provide the increase in enthalpy. As an example, the energy Qin may be obtained from combustion of fossil fuels. The mixture is then sent to an expansion device 130, e.g. orifice plate or a pressure reduction valve. The enthalpy of the process stream is sufficiently raised such that, subsequent to expansion device 130, the solvent gas is completely converted to the vapor phase.

Figure 2:
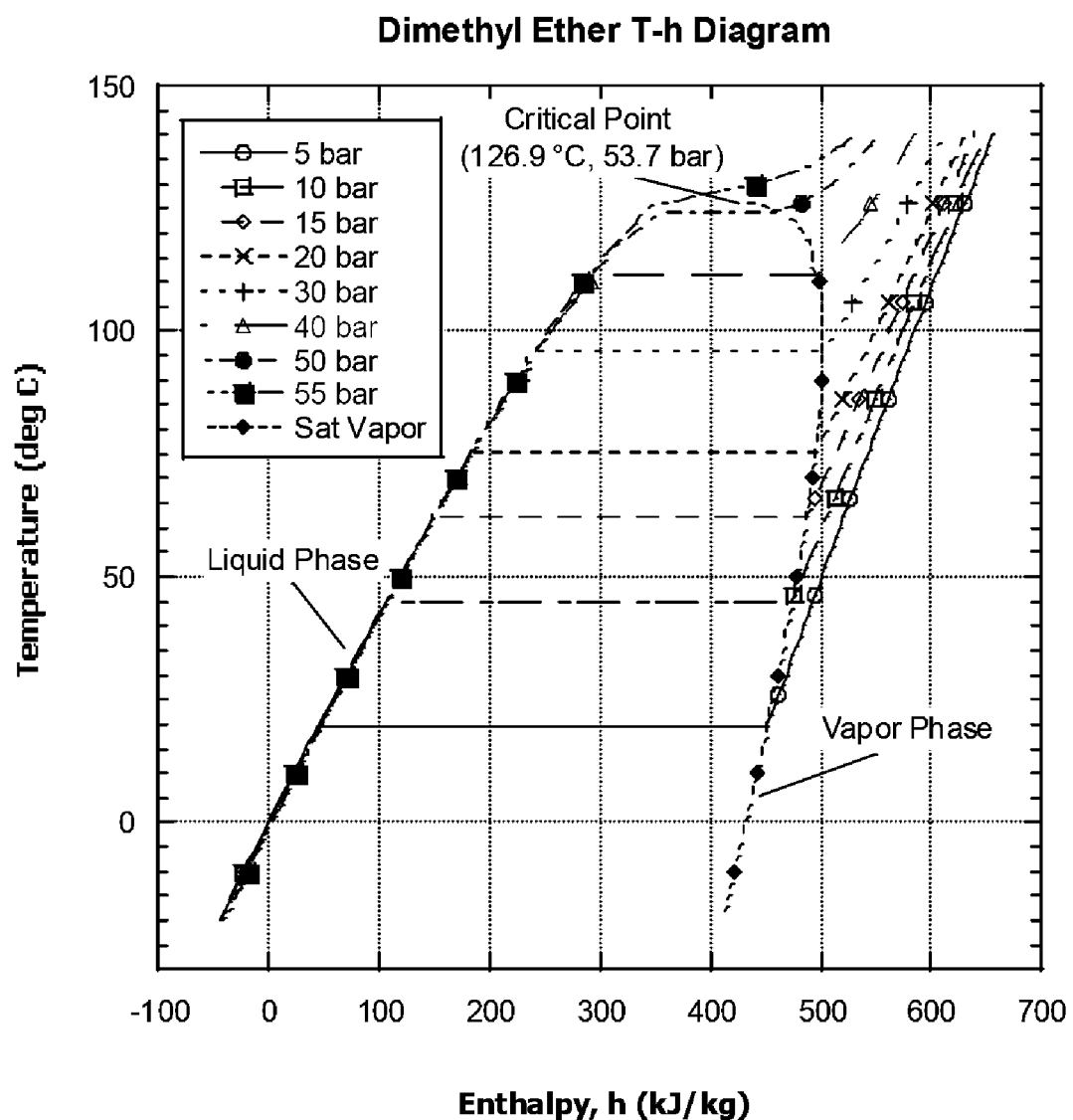
FIG. 2 shows a temperature-enthalpy (T-h) chart 200 illustrating the relationship between temperature and enthalpy for dimethyl ether (DME), a dense gas solvent, as part of the process energy analysis.

FIG. 2 shows a temperature-enthalpy (T-h) chart 200 illustrating the relationship between temperature and enthalpy for dense gas solvent (in this case DME) as part of the process energy analysis. From chart 200, the energy requirements for a phase change in the solvent can be determined. The dome in chart 200 represents the single phase boundaries. The left (lower enthalpy) boundary is for the liquid phase. The right (higher enthalpy) boundary is for the gas (vapor) phase. The maximum on this dome is the critical point where vapor and liquid become one phase.

The horizontal line segments inside the dome represent regions where both phases exist. The horizontal lines are a series of isobars between 5 bar (72.5 psi) and 55 bar (797.5 psi). The width of the dome is the heat of vaporization for a particular pressure (isobar). The temperature at which the conversion of liquid to gas occurs is the boiling point at that particular pressure, i.e. saturation conditions are present. As the pressure increases up to the critical point, the heat of vaporization decreases, as depicted by a narrowing of the dome near its peak. The increase in enthalpy along an isobar is due to Qin being imparted into the solvent vaporization chamber.

Accordingly, at state 2, the thermodynamic state of the solvent may either be in the liquid phase or in a two phase regime of vapor and liquid. The expansion valve 130 lowers the pressure between state 2 and state 3a. When the pressure drop is taken across the expansion valve 130, the process is adiabatic and isenthalpic (h=enthalpy=constant). Any remaining gas in the liquid phase is converted to vapor, thus setting up a large difference between the specific gravity of the gas and that of the solute. The gas and the solute are then sent to the separator 140.

The separator 140, e.g. a cyclonic separator, separates the gas from the solute. In one embodiment, a cyclone and demister within the separator promote the formation of larger droplets and, thus, create conditions such that the liquid is not entrained in the vapor leaving the separator. The gas vapor is then sent to a condensing heat exchanger 150, also termed a solvent condensation chamber.

The condensing heat exchanger 150 is used to condense the gas stream between state 3b and 4. The gas is by cooled below the saturation temperature associated with the pressure within the heat exchanger 150. In one embodiment, water is used to decrease the temperature, wherein the water is at a sufficiently low temperature to cause a transfer of energy Qout from the gas to the water. Note that the saturation temperature is the temperature at which the gas becomes a liquid, and vice versa, for a given pressure.

The recovered and condensed gas is then sent to the extraction chamber 110 through an input 108, and the process cycle repeats. A pump may be used between the condensing heat exchanger 150 and the extraction chamber 110 to increase the pressure to that of extraction chamber 110.

FIG. 3 is a table 300 showing a thermodynamic analysis of a baseline process cycle for DME according to an embodiment of the present invention. The selected operating conditions are highlighted in table 300. They include the extraction pressure, the separation pressure, the separator temperature, and the subcooled DME temperature from the condenser. The process conditions are as follows:
    Mass flow rate=60,000 kg/hr
    Extraction Pressure=10 bar (130 psig)
    Separation Pressure=8 bar (101 psig)
    Separation Temperature=38° C. (100° F.)
    Condenser Discharge=34° C. (93° F.)
All other quantities can be computed from the coupling relationships for each unit operation. The cycle temperatures reflect near ambient conditions. Note that the saturation temperature at 10 bar is 45° C. and at 8 bar is 36.3° C. The heat exchanger conditions are specifically selected to have a small temperature swing around the respective saturation temperatures.

These process conditions have the following energy requirements:
Vaporizer Heat Exchanger=6510 kW or 22e6 BTU/hr
Condensing Heat Exchanger=6510 kW or 22e6 BTU/hr
As can be seen in state 2, the enthalpy change of the DME is 391 kJ/kg. At 10 bar, the heat of vaporization of DME, the energy required to completely convert from a liquid to a vapor, is 368.4 kJ/kg. The slightly higher energy requirement is because the DME is driven from a subcooled state to 98.8% vapor. Moreover, at 8 bar, the heat of vaporization is 382.3 kJ/kg. This compares with the 390.9 kJ/kg change in enthalpy as the process stream is condensed and subcooled between states 3a and 4.

II. Prevention of Clogging in Vaporizer when Liquid Gas is Used

Typical prior art systems provide the solvent vaporization chamber 120 after an expansion device and thus at a lower pressure than the extractor. Such an expansion of the dense gas solvent causes a phase change of at least some of the dense gas from a liquid phase to a gas phase, and also causes a drop in temperature. Because the solvent/solute mixture is typically output in a saturated state from the extraction chamber 110 (to increase the amount of solute extracted), the remaining solvent at the lower temperature cannot support all of the solute in solution. Thus, some of the solute will precipitate prior to input to the solvent vaporization chamber 120.

This precipitation problem is exacerbated because the vaporization of all of the solvent in the solvent vaporizer continues the precipitation of the solute in the solvent vaporizer 130. This precipitation causes problems with solutes that are viscous, sticky, or agglomerative as the precipitated solute can foul the inside of the solvent vaporizer thus decreasing its ability to transfer heat.

In system 100, having the expansion device 130 after the solvent vaporization chamber 120 allows some of the solvent to stay in liquid phase in the solvent vaporization chamber 120. This remaining liquid is vaporized later via the expansion device 130. Thus, less solute will precipitate from solution in the solvent vaporization chamber 120. Some solute may still precipitate due to some of the solvent vaporizing in the solvent vaporization chamber 120 prior to all of the solvent being vaporized through the expansion device 130.

Embodiments reduce or prevent precipitation of the solute by providing the solvent/solute mixture above saturation conditions to the solvent vaporization chamber 120. The increase in pressure enables the temperature to be increased by the solvent vaporization chamber 120 without fully converting the solvent gas to vapor. The increase in temperature while maintaining some the solvent in the liquid phase increases the solubility, thereby reducing solute precipitation.

In one embodiment, a pump is used to increase the pressure between the extraction chamber 110 and the solvent vaporization chamber 120 to increase the solvent saturation temperature. The increased pressure also allows more of the solvent to be vaporized via the expansion device 130, thus also reducing precipitation of the solute. A reduction in the vaporizing exchanger's size can also be achieved. In another embodiment, the solvent/solute mixture output from the extraction chamber is above saturation conditions, as shown in table 300. In this instance, the process temperature is less than the saturation temperature. Accordingly, it is provided to the solvent vaporization chamber 120 above saturation conditions.

Figure 4:
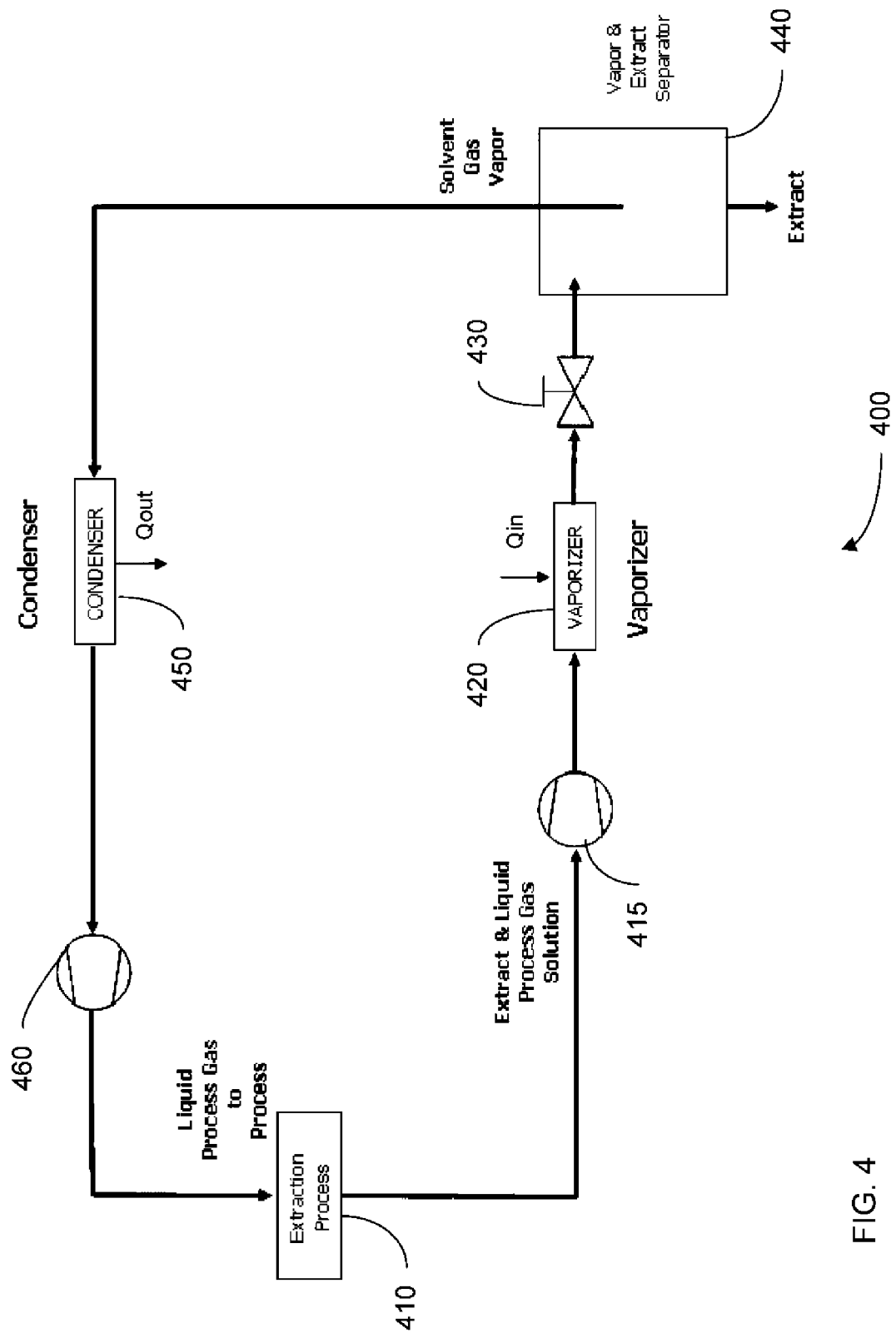
FIG. 4 shows a dense gas extraction/recovery system 400 and process cycle having a pump device that increases pressure to the solvent vaporizer according to an embodiment of the present invention.

FIG. 4 shows a dense gas extraction/recovery system 400 and process cycle having a pump device that increases pressure to the solvent vaporizer according to an embodiment of the present invention. Similar items in system 100 have similar reference numerals in system 400.

The solvent/solute mixture leaves the extraction chamber 410 and is sent to a pump device 415, which is operable to increase the pressure of the process stream delivered to the vaporizer 420, also termed a solvent vaporization chamber. The vaporizer 420 is used to raise the enthalpy of the process stream and vaporize a portion of the gas that is acting as solvent. The expansion device 430 (e.g. a pressure reduction valve) provides the vaporization of the remaining solvent as described above.

A benefit of system 400 is the positions of the pump 415, the vaporizing heat exchanger 420, and the pressure reduction valve 430. The positions enable a portion of the heat transfer that occurs in the vaporizer 420 to occur while the process gas is in the liquid phase.

In the vaporizer, an increase in temperature, provided that it does not result in a change of phase from liquid to gas, results in higher solute solubility. If a sufficiently high pressure is maintained such that the increase in enthalpy accompanying the increase in temperature of the gas does not result in a phase change, the precipitation may be reduced.

If the pressure is not sufficiently large, then with an increase in enthalpy (heat transferred to the process gas), the liquefied gas may be partly converted to the vapor phase. Even with some of the solvent undergoing a phase transition, the remaining liquefied process gas would tend to "recapture" the solute that precipitates from the portion of the process gas that was vaporized. The remaining liquid can recapture the solute because the increase in temperature has increased its ability to dissolve more solute.

Three independent pressures can exist: one that varies with the ambient temperature in the extractor 410, a second that is controlled and is greater than the pressure in the separator 440, and a third pressure in the separator 440 and the condensing heat exchanger 450 that is less than the pressure in the vaporizer 420. Note that the pressure in the extractor 410 is isolated from the pressure in the condenser via pump 460. In one embodiment, the pressure reduction valve 430 is replaced by a turbine expander.

Figure 5:
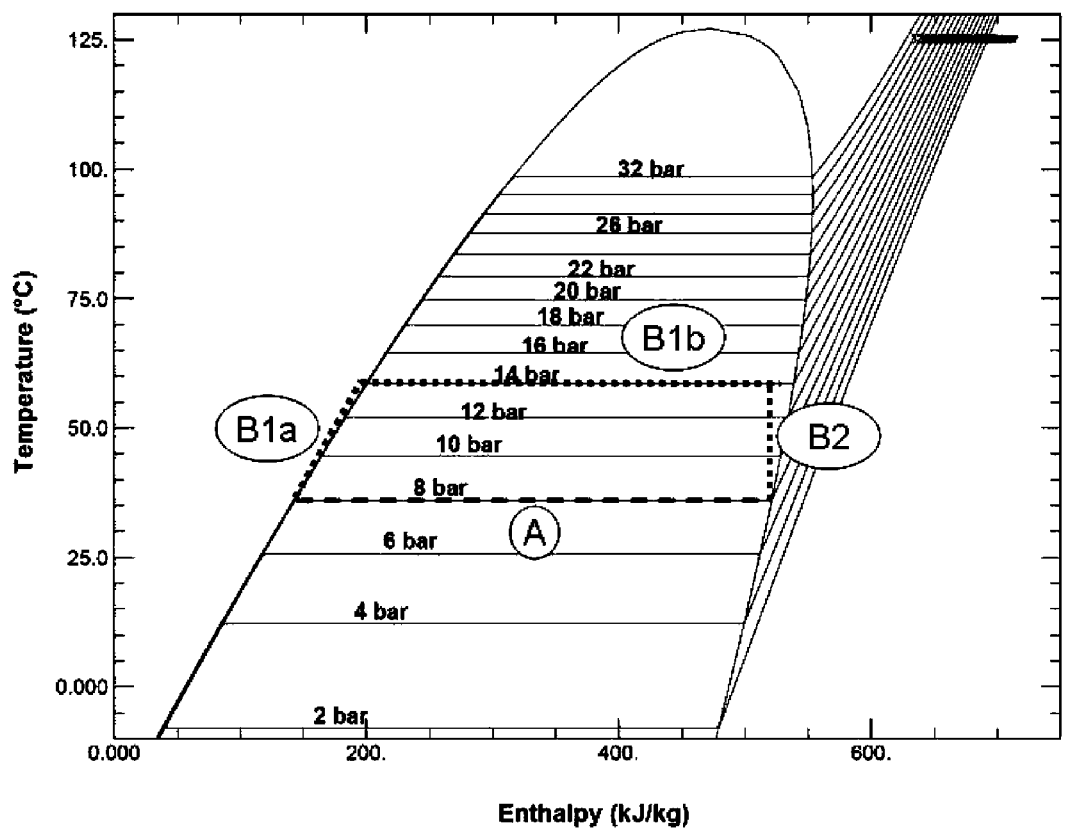
FIG. 5 shows an alternative view the relationship between temperature and enthalpy for DME according to an embodiment of the present invention.

FIG. 5 shows a process for vaporizing the solvent using a pump device to increase pressure as depicted in a temperature-enthalpy (T-h) chart diagram according to an embodiment of the present invention. The dome marks the region of saturated gas where the liquid phase can coexist with the vapor phase. In this region, only the temperature or the pressure can vary independently. In a liquefied gas extraction process, this is the region that the gas is either at saturation conditions or in the liquid phase near saturation conditions.

The left side of the dome represents liquid phase conditions and the right side represents vapor phase conditions. The dome's maximum is the critical point for DME. The difference between the enthalpy at the left side of the dome and the right side for a particular gas pressure is the heat of vaporization of the gas at that particular pressure. The heat of vaporization decreases as the gas pressure increases. At the critical point, the heat of vaporization is zero.

In the two processes shown, the separation, via separator 440, ultimately occurs at 8 bar. The conventional process, as shown by line A, shows the separation process (vaporizer and the separator with no expansion device) operating at a constant pressure. The vaporizing heat exchange occurs at biphasic conditions as the liquid DME is fully transformed to vapor DME.

Under the alternate process, the heat exchanger would operate at 14 bar and the separator would operate at 8 bar. Pump1 415 is used to increase the pressure from 8 bar to 14 bar. This change in pressure results in sufficiently small change in enthalpy that this step is not shown in the figures. The heat exchange in the solvent vaporizer 420 can be considered to occur in two steps, one shown as B1$a$ and another as B1$b$. During the B1$a$ step, the gas is in liquid phase condition and is heated until the temperature reaches saturation conditions. Since the gas is in a liquid phase, a smaller heat exchange area is required to perform this portion of the heat transfer than transferring the same quantity of heat in the vapor phase. During the B1$b$ exchange, the gas is in biphasic state; however, the gas is not fully converted to vapor. Although the process can be viewed as two steps, this may be implemented as a single heat exchanger or two, optimized heat exchangers.

The increased pressure provides a means to decrease the size of the vaporizing heat exchanger and also to provide more evaporation with the pressure reduction valve 430 so that less solvent evaporates in the vaporizer 420, thus providing less potential fouling by the solute.

The expansion through the expansion device from 14 bar to 8 bar is isenthalpic (h=constant) and is shown by line B2. At higher pressures, an increasing amount of liquid solvent is turned into vapor via the expansion device 430, thereby reducing the amount of solute that could precipitate in the vaporizer 420. Additionally, the exchange method as shown by lines B1$a$, B1$b$, and B2 requires a smaller and more cost-efficient heat exchanger than the process shown by line A.

III. Isolation of Extraction and Separation

In system 400, as shown, pumps 415 and 460 isolate the extraction process from the separation process. In a typical liquefied gas system, only pump 460 would exist. Pump 415 isolates the process conditions for extraction from those in the separator. Under certain instances with liquefied gas solvents for particular solutes (e.g. liquid butane or propane for lipids, fats, and oil), solubility behavior is sufficiently large that broad fluctuations in ambient temperature do not result in negatively affecting solubility such that extraction would be impaired. As such, there is no need to constrain the temperature in the extractor for purposes of extraction. Thus, the pressure within the extraction process could also freely vary.

Figure 6:
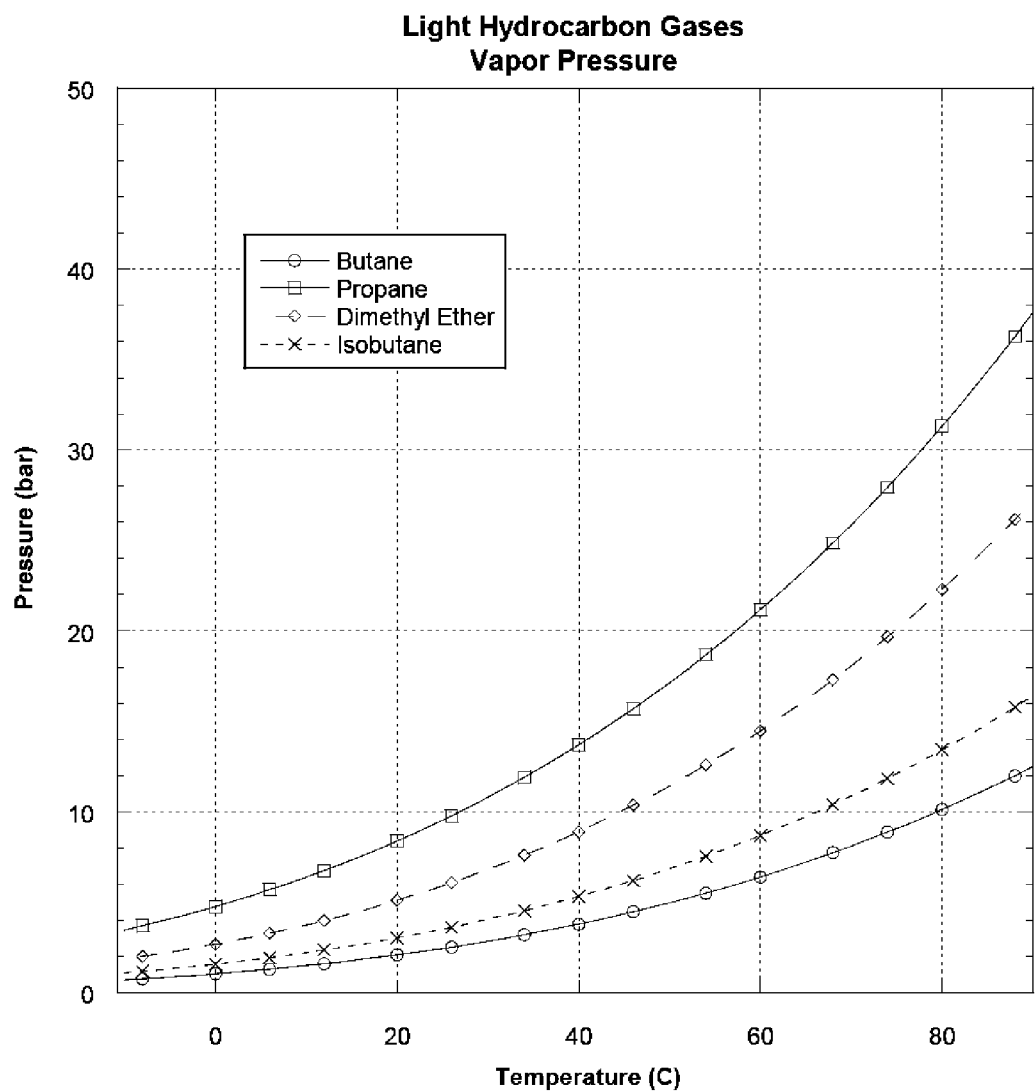
FIG. 6 shows vapor pressure curves for the common light hydrocarbon gas solvents.

The effect of variation of pressure with respect to temperature can be seen in the vapor pressure curves for the common light hydrocarbon gases as shown in FIG. 6. A reasonable variation in ambient temperature might be from 10 to 60° C. For butane, at 10 and 60° C., respectively, the required pressures would be 1.49 and 6.39 bar absolute, respectively. For dimethyl ether, at 10 and 60° C., respectively, the required pressures would be 3.73 and 14.47 bar absolute, respectively. As ambient temperature in the extractor varies, there would be a coupled and significant change in the extraction pressure, which would normally affect the separation process.

Pump 415 isolates the extraction conditions from the heat pump and separation conditions. Pump 415 can either lower or raise the pressure from extraction conditions to the pressure that is optimal for separation operation, as well as for operation of a heat pump as is discussed below. If the pressure is only reduced from the extractor to the vaporizer and separator, then a passive control valve would be sufficient to maintain the temperature in the separator system. Thus, in one embodiment, pump 415 includes a passive control valve. In cold ambient conditions in which the pressure in the extractor would be too low to supply gas to the vaporizer, pump 415 increases the pressure to enable system operation. Accordingly, the temperature in the extraction chamber is allowed to freely vary, thus reducing design, materials, and energy costs associated with the extraction chamber.

Figure 7:
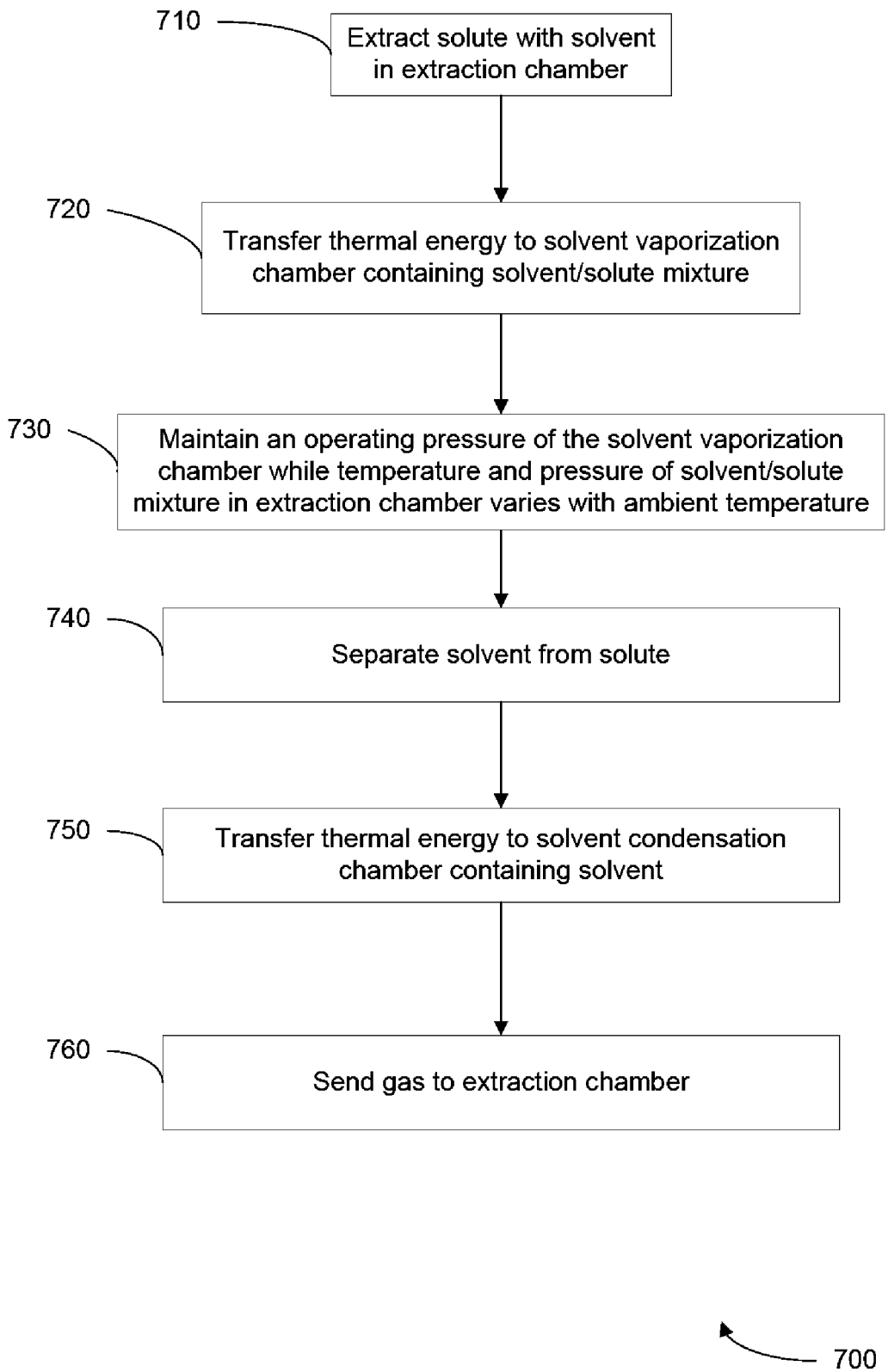
FIG. 7 shows a flowchart illustrating a method 700 for extracting a solute using a dense gas solvent and recovering the dense gas solvent according to an embodiment of the present invention.

FIG. 7 shows a flowchart illustrating a method 700 for extracting a solute using a dense gas solvent and recovering the dense gas solvent according to an embodiment of the present invention. In step 710, a solute is extracted from a sample in an extraction chamber (e.g. 410) using a dense gas solvent, thereby creating a solvent/solute mixture. The solvent/solute mixture is transferred to a solvent vaporization chamber (e.g. vaporizer 420)

In step 720, thermal energy is transferred to the solvent vaporization chamber containing the solvent/solute mixture. In one embodiment, the energy is transferred via a heat exchange process, e.g., as described herein.

In step 730, an operating pressure of the solvent vaporization chamber is maintained to be within a prescribed operating range while a temperature of solvent/solute mixture in the extraction chamber is allowed to vary with an ambient temperature. In one embodiment, the operating pressure is maintained with a pump (e.g. 415) that can increase or decrease pressure from the extraction chamber to the solvent vaporization chamber.

In step 740, the dense gas solvent is separated from the solute in any number of ways as is mention herein and is known to one skilled in the art. For example, expansion device (e.g. 430) and a separator (e.g. 440) may be used. The dense gas solvent is then transferred to a first solvent condensation chamber (e.g. condensing heat exchanger 450).

In step 750, thermal energy is transferred from the first solvent condensation chamber containing the dense gas solvent. This provides a condensing of the solvent for re-use in the extraction process. In step 760, the dense gas solvent is sent to the extraction chamber.

The isolation of the extraction chamber 410 and the vaporizer 420 has particular benefits when a heat pump is used to supply Qin and to receive Qout. A heat pump is typically designed to work optimally under a narrow range of high and low temperature/pressure conditions, and, thus, it is advantageous to have system features that enable the heat pump to operate in this narrow range. In order to assure that the refrigerants stay in this narrow range, prior art methods controlled the temperature of the dense gas in the extraction chamber. However, this can require a lot of energy when the extraction chamber is large, and particularly when it is not housed in a controlled environment, e.g. an exterior environment.

Method 700 allows for the operation of the heat pump in a narrow range by controlling the pressure of the dense gas solvent at points (vaporization and condensation chambers) where it interacts with the heat pump. Accordingly, the temperature in the extraction chamber is allowed to freely vary, e.g. with the ambient temperature. This application is described below, but first the operation of a heat pump is first discussed.

IV. Utilization of Heat Pump

A heat pump (refrigeration cycle) is used to drive a thermal imbalance in a pressurized gas processing cycle. In one aspect, embodiments leverage the ability to tailor the pressure of the solvent "gas"/liquefied gas to match the thermodynamic behavior of the refrigerant in the heat pump cycle.

As described above, heat is added to and removed from the process stream to convert the solvent (dense gas) from the liquid phase to vapor phase, and vice versa. Since this gas processing system has a need for both heating (to vaporize the solvent "gas") and cooling (to condense and subsequently recycle the solvent gas), this makes the process cycle a candidate for a heat pump. The precise conversion temperatures are based on the vapor pressure curve for the gas or mixture of gases of interest.

When a pressurized gas is used as the solvent media, the temperature conditions for vaporization and condensation of this gas can be tailored to match with the practical operating range for refrigerants. As we have discovered, this can be achieved by using a variety of commercial refrigerants, including R11, R12, R13, R14, R21, R22, R32, R41, R113, R114, R115, R116, R123, R124, R125, R134a, R141b, R142b, R143a, R152a, R218, R227ea, R236ea, R236fa, R245ca, R245fa, R365mfc, RC318, or R410a, where the most common are R22, R123, R134a, and R410a. For practical reasons, R123 has been chosen for certain applications and is discussed below.

The use of a heat pump enables electrical energy to drive a motor for the compressor and to have this energy input leveraged to achieve both a heating and a cooling effect that is required in the process. This process enables the use of electrical energy at a cost that is more competitive than that from heating via direct combustion of fuel gas. It also has the advantage of being a "green" process as the electrical burden could be addressed via a carbon neutral generation means.

Heat Pump

Figure 8:
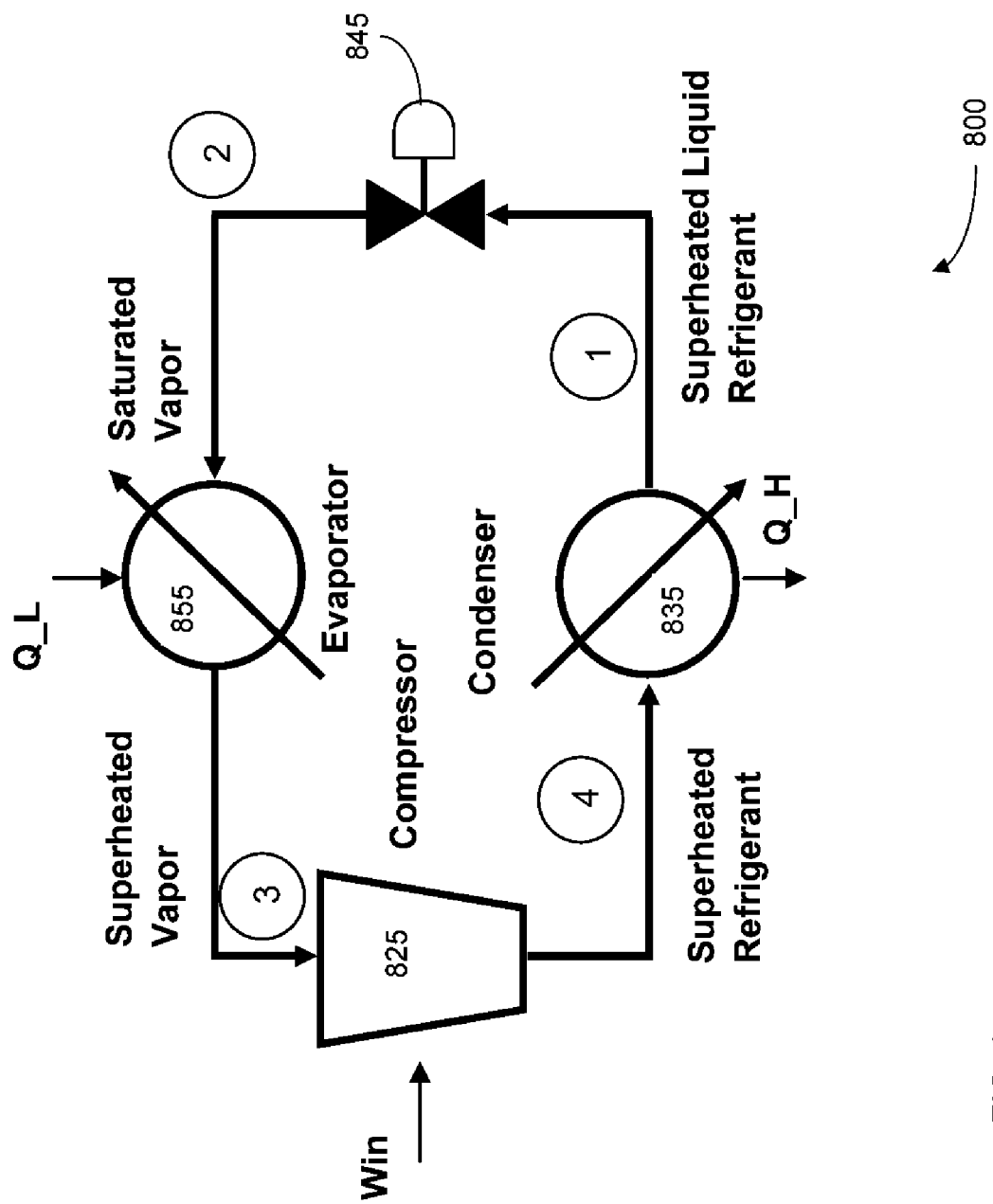
FIG. 8 shows a process cycle for a heat pump according to an embodiment of the present invention.

FIG. 8 shows a process cycle for a heat pump 800 according to an embodiment of the present invention. In one aspect, a heat pump uses an electrically driven compressor to drive a refrigerant cycle. The heat output Qout (from the condenser 450 for the solvent gas process cycle) is used as the heat input for the heat pump cycle. The heat input (to the solvent gas vaporizer heat exchanger) is used to absorb the heat output for the heat pump cycle.

The cycle includes four elements: a compressor 825, condenser 835, expansion means 845 (e.g. an orifice plate, a line restriction, or a valve), and an evaporator 855. Heat is pulled out of the refrigerant by the condenser 835 and rejected into a heat sink in the form of the vaporizing exchanger for solvent gas. This converts the superheated gas refrigerant to a liquid prior to flow through the expansion valve 845. In one aspect, the expansion valve 845 results in Joule-Thompson cooling of the refrigerant. The cold refrigerant absorbs heat from the other process stream (i.e. from the solvent gas condenser) to vaporize the refrigerant. The compressor converts vapor from a low pressure condition to high pressure condition.

From conservation of energy, the following equation can be written:

$$Q\_L + Win = Q\_H.$$

Electrical energy nominally used to drive an electric motor that, in turn, drives the compressor 825, thus Win is directly related to the electrical requirements for this system. Other motive means may be employed to drive the compressor 825, including an internal combustion engine, water turbine, wind-driven turbine, microturbine, or geothermal turbine. When referring to electrical energy, this generally refers to motive energy input into the refrigeration cycle. Generally, the compressor efficiency of this conversion of energy is on the range from 70 to 80% efficient (1 kW power in compressor cycle requires 1.43 to 1.25 kW of electrical power). This energy is used to drive the transfer of heat from a low temperature region (the condenser) to a high temperature region (vaporizer). Through appropriate selection of the refrigerant and the process conditions in the loop, the heat pump 800 can become a significant amplifier of the electrical energy into the process.

In embodiments using electrical motive energy, to achieve an energy benefit over other heating methods, the electricity energy should be used in an efficient manner due to the relatively low cost of combustion as a competing means for supplying the heat input into the solvent gas vaporizer. For purpose of comparison, it is convenient to compute a coefficient of performance (COP), a thermodynamic metric that reflects the efficiency of electrical energy input:

$$COP = Q\_L/Win$$

With increases in COP, the heat pump cycle is an increasing amplifier of input electrical power.

Utilization with System 100

Figure 9:
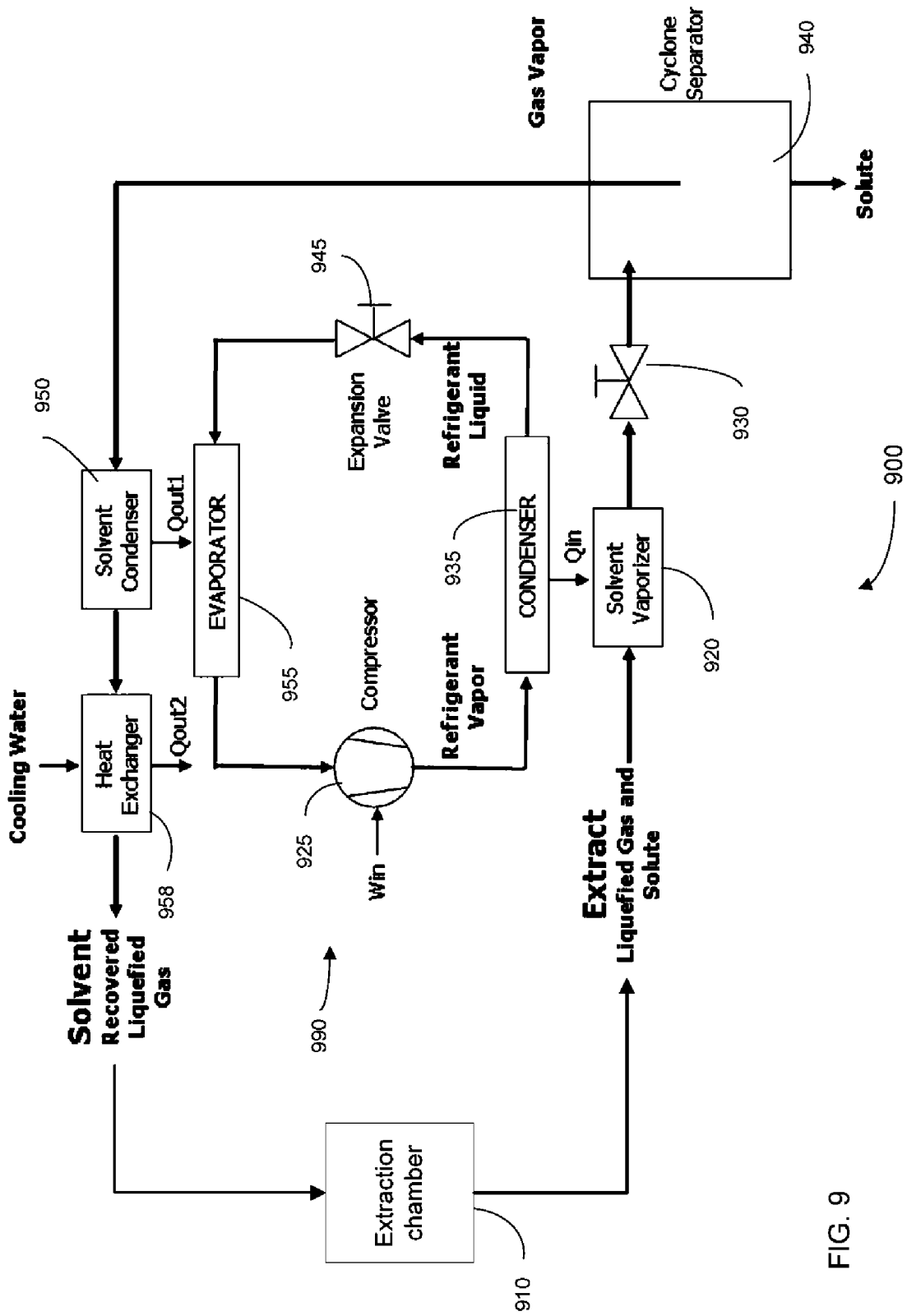
FIG. 9 shows a dense gas extraction/recovery system 900 and process cycle using a heat pump according to an embodiment of the present invention.

FIG. 9 shows a dense gas extraction/recovery system 900 and process cycle using a heat pump 990 according to an embodiment of the present invention. Similar items in system 100 and heat pump 800 have similar reference numerals in system 900.

As shown, the heat pump 990 within the extraction gas process cycle is used to absorb heat at the solvent condenser 950 (heat input Qout1 into the heat pump cycle) and reject heat at the solvent vaporizer 920 (heat output Qin). In one embodiment, the heat pump 990 is designed so that the heat output (Qin) is sufficiently large to meet all the requirements for solvent vaporization in the solvent vaporizer 920. However, generally, the heat output (Qin) from the heat pump is greater than the heat input (Qout1). Thus, the heat absorption capacity of the evaporator 955 from the solvent condenser 950 for solvent condensing is then typically insufficient to fully condense the gas vapor of the solvent.

This imbalance between the Qin and Qout1 can be at least partly compensated by increasing the energy Win into the compressor 925 to increase the refrigerant mass flow through the condenser 935. However, increasing Win can be inefficient. Also, the higher mass flow in the condenser 935 can lead to higher manufacturing and maintenance costs.

In one embodiment, a second fluid heat exchanger 958 is employed to ensure a full condensation of the gas vapor. In one aspect, the process conditions for gas separation are adjusted so that the nominally cooling requirement, Qout2, to fully condense the gas vapor to the liquid phase can be supplied with a super-ambient temperature cooling medium. In the example shown, this is shown as cooling water. Embodiments may employ many methods for secondary cooling, such as a chilled water source or a secondary, air-condensing or water-condensing refrigeration system.

In another embodiment, a sufficient cooling to condense the solvent is ensured with an additional element (e.g. an additional heat exchanger) in the heat pump 990. This embodiment is described in more detail with reference to FIG. 15.

As would be familiar to a person skilled in the art, there may be more complex embodiments of the heat pump cycles providing a variety of bypass or alternate flow paths for the refrigerant. All these methods are considered to be within the scope of the invention.

As an example process cycle, consider a method in which the gas solvent is dimethyl ether (DME). The refrigeration gas is R123 (dichlorotrifluoroethane or 2,2-dichloro-1,1,1-trifluoroethane), a HCFC (hydrochlorofluorocarbon) replacement for R-11 whose production was halted by the Clean Air Act of January 1996. R-123 is a liquid at atmospheric temperature and pressure. A few R-123 properties are as follows:

Boiling Point: 27.6° C. (81.7° F.) at 760 mm Hg (1 atm=1.01325 bar)

Liquid Density: 1.46 kg/L @25° C. (77° F.)

Vapor Pressure: 13 psia (0.8964 bar) at 25° C. (77° F.)

Vapor Density: 5.3 (Air=1.0)

Solubility in Water: 0.39 wt % at 25° C. (77° F.)

pH: Neutral

Odor: Ether (slight)

Form: Liquid

Color: Clear, colorless

Figure 10:
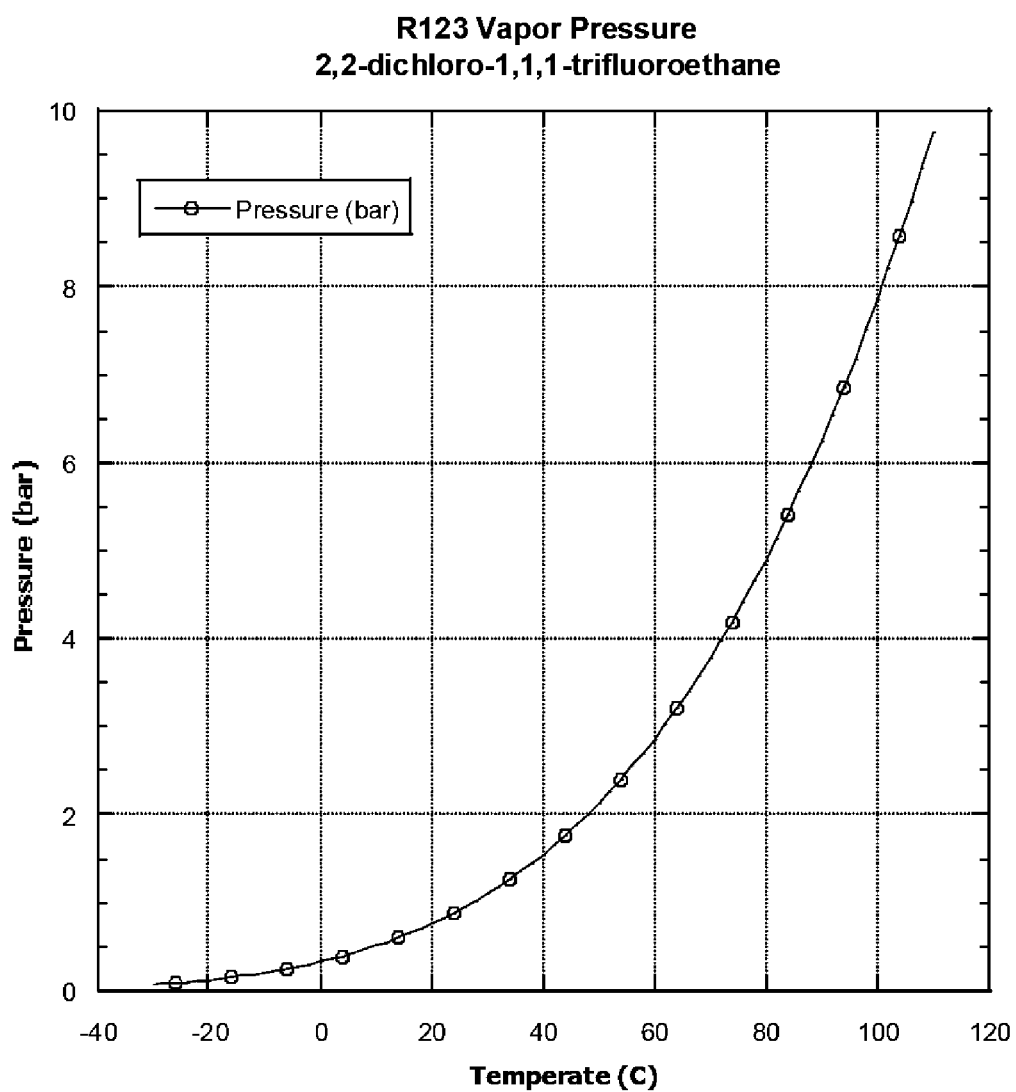
FIG. 10 is a graph showing the vapor pressure for R-123.
Figure 11A:
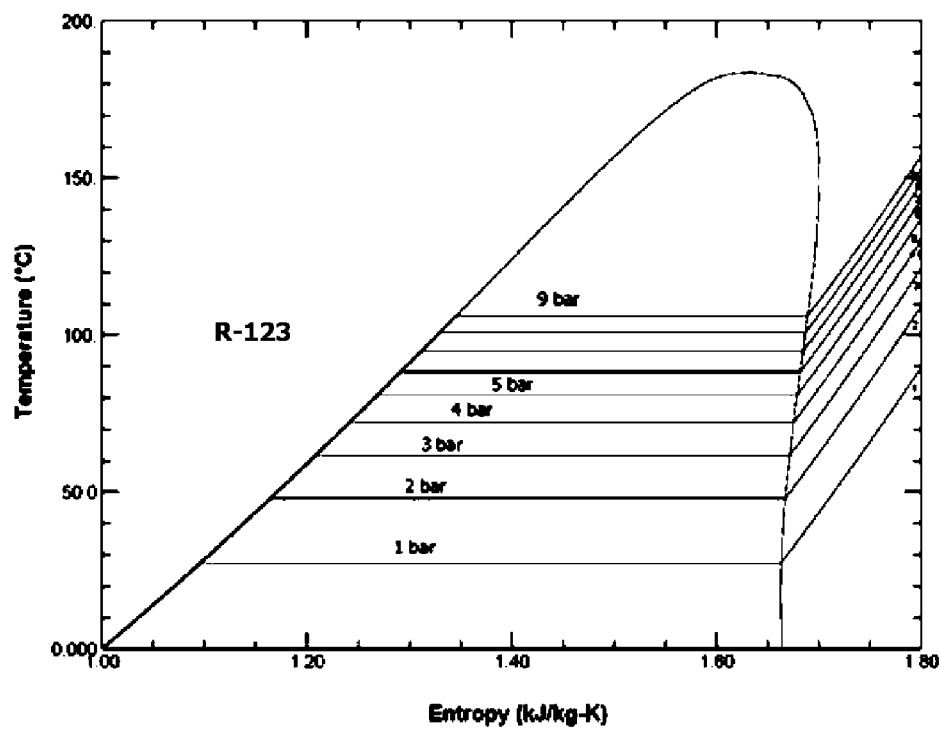
FIG. 11A is a temperature-entropy (T-S) diagram of R-123.
Figure 11B:
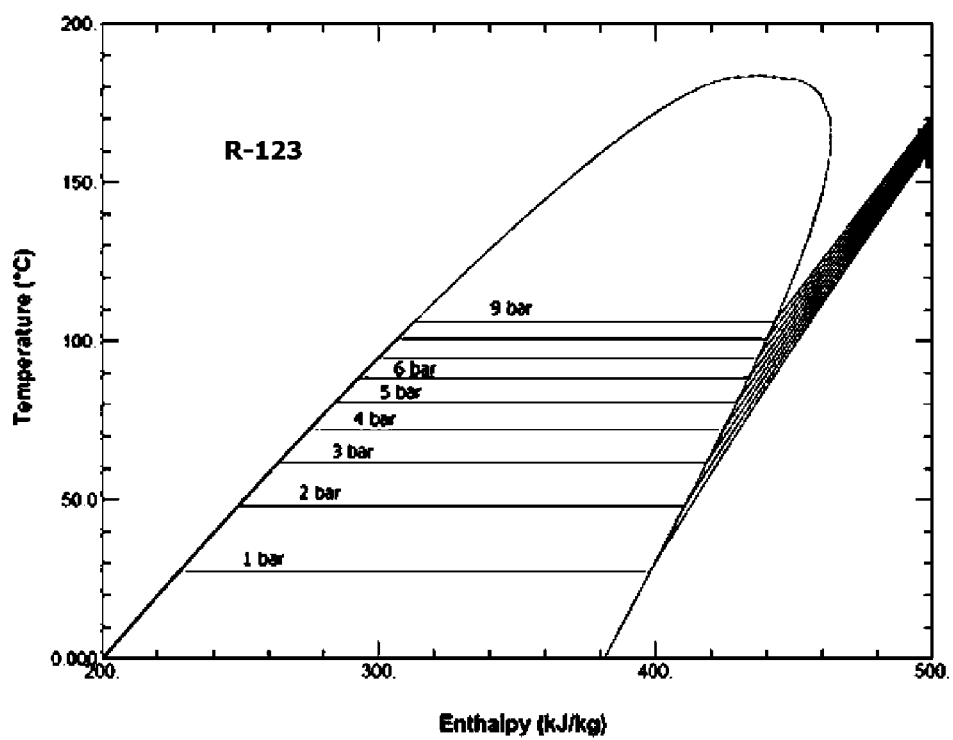
FIG. 11B is a temperature-enthalpy (T-H) diagrams for R-123.

The vapor pressure for R-123 is shown in graph in FIG. 10. The temperature-entropy (T-S) and temperature-enthalpy (T-H) diagrams for R-123 are given in FIGS. 11A and 11B, respectively.

The solvent vaporizer 920 is used as a cold sink for a refrigerant cycle and the solvent condenser 950 is used as a source of heat. This method requires the identification of an appropriate refrigerant and subsequent computation of the heat and cooling loading within the refrigerant cycle.

From table 300 of FIG. 3, the baseline DME swings between a maximum temperature of 45° C. (vaporizer) and a minimum temperature of 34° C. (condenser). At both points in the process cycle, a fluid-fluid (DME to refrigerant) heat exchanger is required and a temperature difference must exist between the refrigerant and the DME to provide a driving mechanism for the exchanger. The larger this temperature difference, the smaller the heat exchanger is. The smaller the temperature difference, the larger and more complex the exchanger design needs to be. For sizing purposes, we assume that the low temperature for the refrigerant is on the range of 25° C. and the high range at 55° C. Thus, a 10° C. (18° F.) temperature difference is available for both exchangers.

A challenge is to select a refrigerant that might be appropriate for this temperature swing. The refrigerant should have a vapor pressure range that is practical for commercial air conditioning apparatus and should be commercially available. From a practical standpoint, the compression ratio (high to low pressure) should be on the range of 3 to 4 to enable a practical machine to be built. For this temperature range, the most suitable, commercial refrigerant is R-123.

Figure 12:
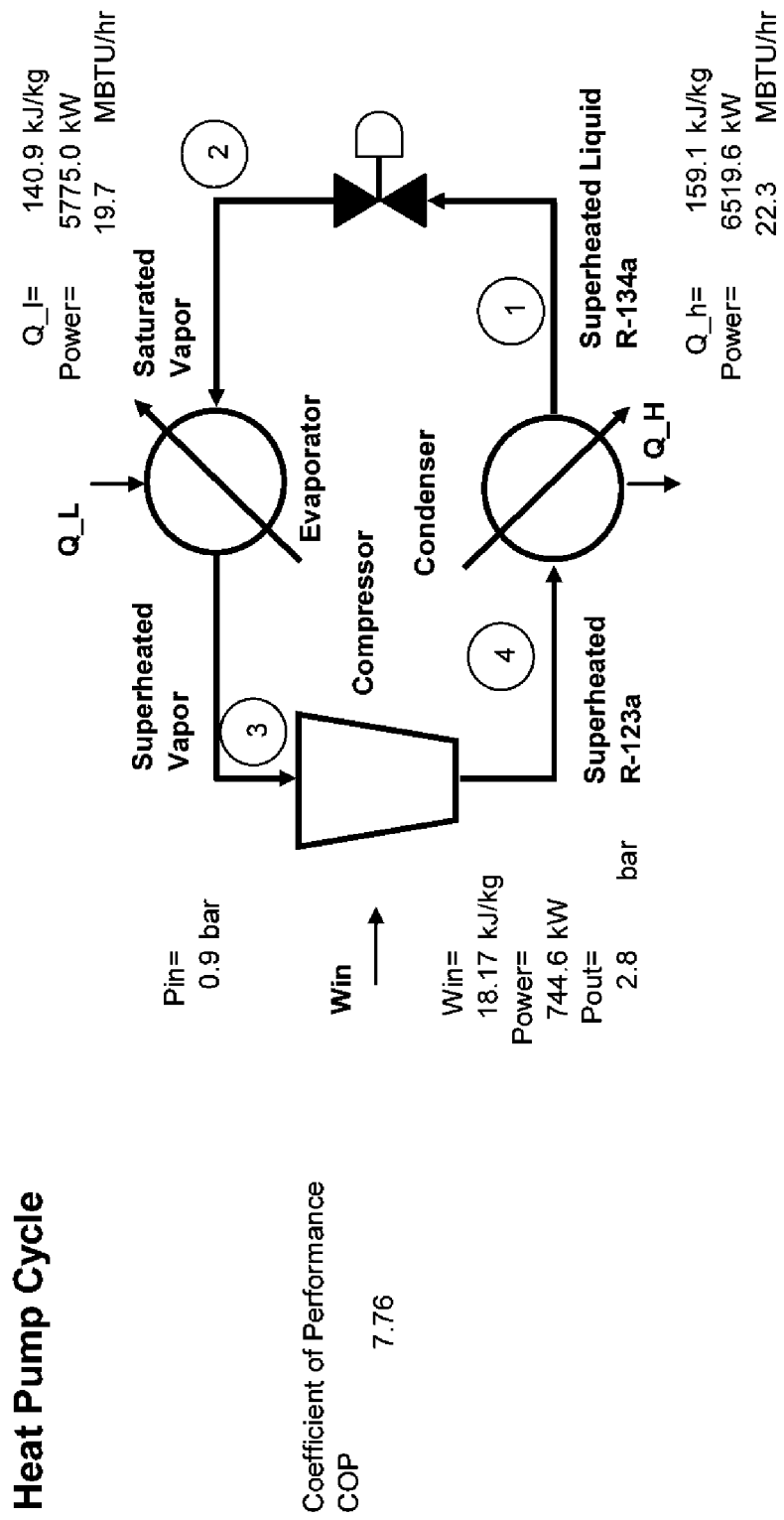
FIG. 12 shows a thermodynamic analysis of the process cycle for R-123 in a heat pump according to an embodiment of the present invention.

FIG. 12 shows a thermodynamic analysis of the process cycle for R-123 in a heat pump according to an embodiment of the present invention. The flow rate of R-123 was selected so that the high temperature output of the heat pump equals the heat input required for DME vaporization or approximately 6500 kW. This heat load is provided through the input of 745 kW (1000 HP) of compressor power. The coefficient of performance for this process cycle is nearly 8. The R-123 flow rate is 147,500 kg/hour or 2458 kg/min. For this process cycle, the condenser discharge is at 2.8 bar (26 psig) and 55°

C. and the evaporator discharge (compressor suction) is 0.9 bar (−2 psig) and 26° C. The heat exchanger on the hot gas side (DME vaporizer) experiences a temperature change from 59 to 55° C. The condenser on the cold liquid side (DME condenser) experiences a temperature change from 24.5 to 26° C. The details of this thermodynamic analysis are given in FIG. 13.

The energy input for the total heating load and the majority of the cooling load is 745 kW. This is a significantly less than the 6500 kW heat load required to vaporize DME. In addition, the process supplies a cooling effect of 5775 kW.

Utilization with System 400

Figure 14:
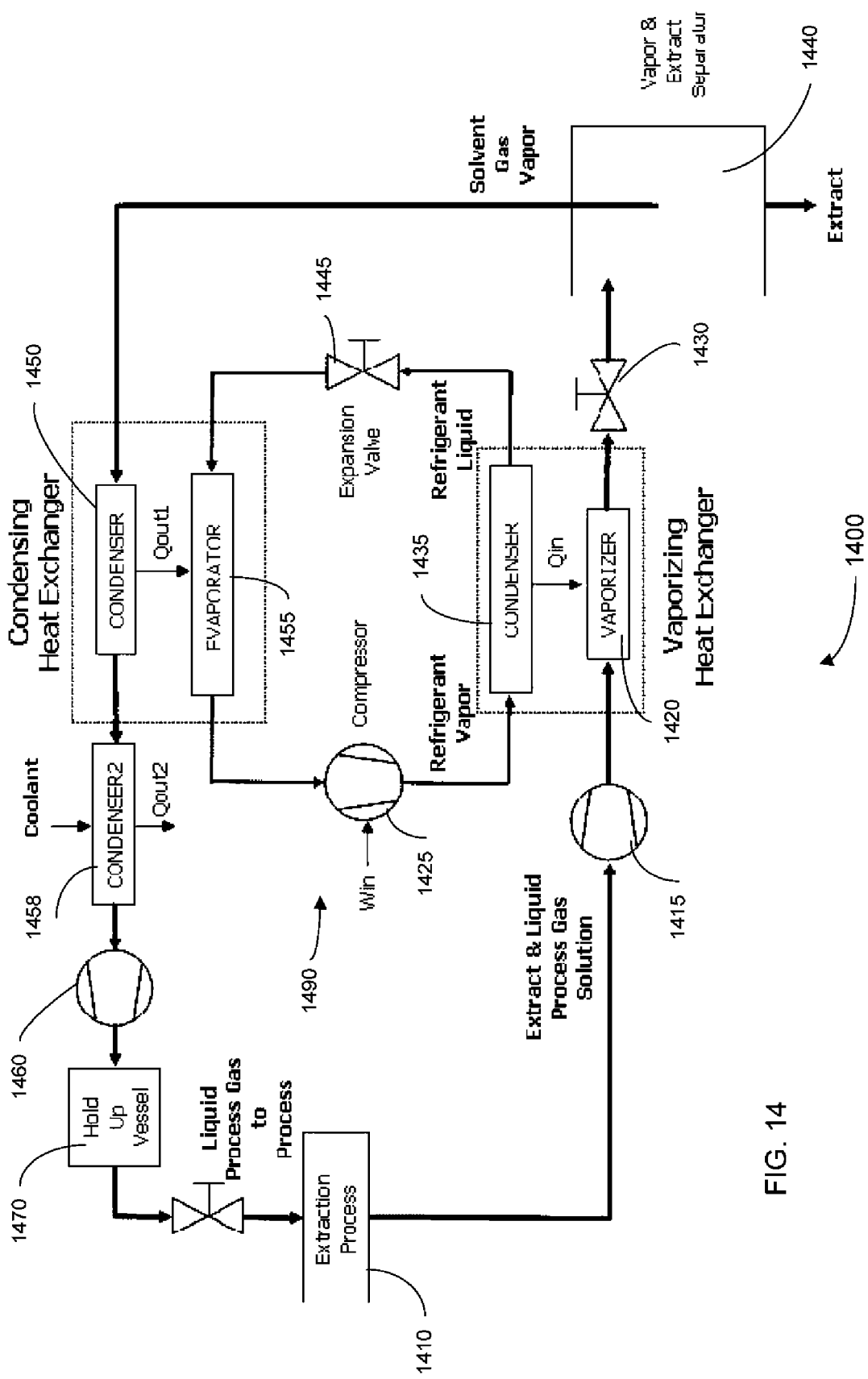
FIG. 14 shows a dense gas extraction/recovery system 1400 and process cycle having a pump device that increases pressure to the solvent vaporizer and including a heat pump according to an embodiment of the present invention.

FIG. 14 shows a dense gas extraction/recovery system 1400 and process cycle having a pump device that increases pressure to the solvent vaporizer and including a heat pump 1490 according to an embodiment of the present invention. Similar items in system 400 and 800 have similar reference numerals in system 1400.

The solvent/solute mixture leaves the extraction chamber 1410 and is sent to a pump device 1415, which is operable to increase and/or decrease the pressure of the vaporizer 1420, also termed a solvent vaporization chamber. The vaporizer 1420 is used to raise the enthalpy of the process stream and vaporize a portion of the gas that is acting as solvent.

As shown, the vaporizing heat exchanger includes the vaporizer 1420 of the process gas cycle and the condenser 1435 of the heat pump 1490. The heat pump 1490 shown within the extraction gas process cycle is used to reject heat at the solvent vaporizer 1420 (heat output Qin) from the condenser 1435. The expansion device 1430 (e.g. a pressure reduction valve) provides the vaporization of the remaining solvent as described above.

The gas and the liquid solute are sent to the separator 1440, which separates the gas from the liquid solute. The gas vapor is then sent to a condensing heat exchanger 1450, also termed a solvent condensation chamber. As shown, the condensing heat exchanger includes the condenser 1450 of the process gas cycle and the evaporator 1455 of the heat pump 1490. The heat pump 1490 absorbs heat at the solvent condenser 1450 (heat input Qout1 into the heat pump cycle).

In one embodiment, a second fluid heat exchanger 1458 is employed, as is done by heat exchanger 958. A second pump 1460 is used to increase the pressure of the condensed gas for more efficient storage in a vessel 1470. When the solvent is needed, it is then released through a valve, which may involve a decrease in pressure depending on the ambient pressure conditions, into the extraction chamber 1410.

Consider the previous example for DME with a heat pump. In this case, the separation conditions were optimal with DME at 8 bar in the vaporizer 1420 and separator 1440. At saturation conditions, 8 bar corresponds to 36.0° C. For all extraction conditions above 36° C., then a passive control valve 1415 could lower the pressure from the extractor conditions to those for the vaporizer and separator. For all temperatures below 36° C., the pressure would need to be boosted. For example, at 25° C., the DME saturation pressure is 5.90 bar. At 15° C., the DME saturation pressure is 4.37 bar. Under these lower ambient conditions, which, depending on the location of installation and the expected climatic variations, might be very common, pump 1415 would be required to boost the pressure between the extractor and the vaporizer/separator.

Moreover, in the event that the ambient condition is greater than 36° C., then the pump 1415 acts as a pressure reduction device and, in effect, a turbine-expander. With appropriate selection of equipment, the expanding gas through the pump may be used to drive the pump's electric motor in a generator mode. Thus, the expanding gas may be used to generate electricity and partially offset the electrical requirements of the overall system.

Figure 15:
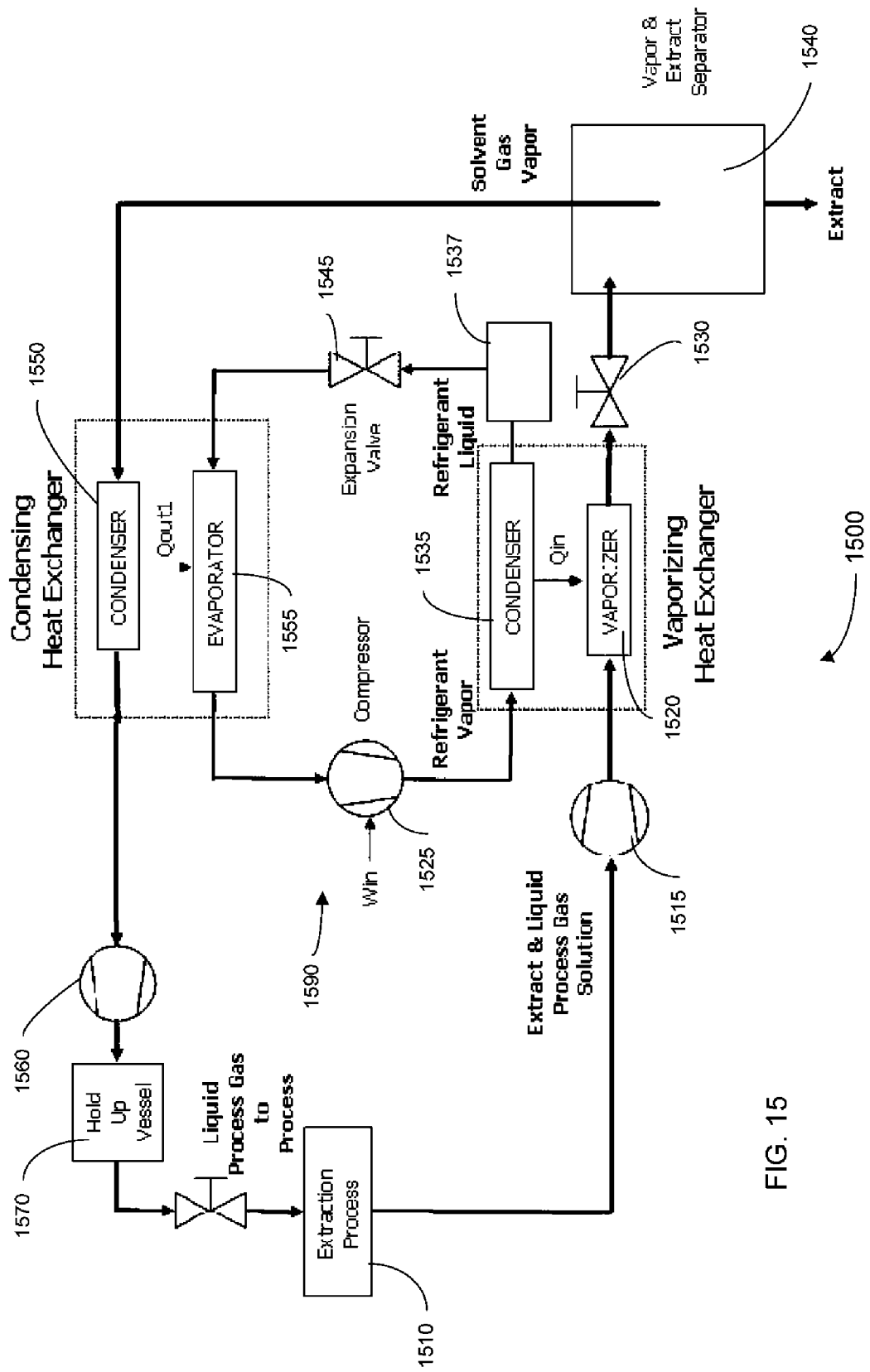
FIG. 15 shows a dense gas extraction/recovery system 1500 and process cycle having a pump device that increases pressure to the solvent vaporizer and including a modified heat pump 1590 according to an embodiment of the present invention.

In another embodiment, a sufficient cooling to condense the solvent is ensured with an additional element (e.g. an additional heat exchanger) in the heat pump 1490, instead of or in addition to FIG. 15 shows a dense gas extraction/recovery system 1500 and process cycle having a pump device that increases pressure to the solvent vaporizer and including a modified heat pump 1590 according to an embodiment of the present invention. Similar items in system 1400 have similar reference numerals in system 1500. Relative to system 1400, an additional element is added to the heat pump 1590 and the second fluid heat exchanger 1458 is removed.

If the compressor 1525 is not perfectly sized relative to the heating and cooling requirements of the process gas loop, the refrigerant may be two phase (both liquid and vapor) when passing through the expansion valve 1545. System 1500 is directed to addressing this problem of the compressor 1525 not being perfectly sized.

In one embodiment, an additional heat exchanger 1537 is added after the condenser 1535. The heat exchanger 1537 may be part of a fan coil, which is a heat exchanger and fan combination. In one aspect, the heat exchanger 1537 is used to reject the last bit of heat from the refrigerant so that the refrigerant is in the full liquid phase prior to flowing through the expansion valve. For example, a fan may be used to blow ambient air (which is cooler than the refrigerant) over coils of the heat exchanger, thus transferring heat away from the refrigerant.

As the refrigerant is more liquefied (potentially completely in the liquid phase) after the heat exchanger 1537, the subsequent passage through the expansion valve 1545 can provide a lower temperature of the refrigerant. With this lower temperature, the refrigerant can absorb a great amount of heat (Qout1), which is sufficient to condense the dense gas solvent. In one aspect, more energy Win may have to be supplied to compensate for the extra loss in energy from the heat expelled via heat exchanger 1537. Such embodiments can reduce the capital cost of implementation relative to system 1400 while incurring a modest penalty in the energy associated with the heat exchanger 1537.

Additionally, the size of the compressor 1525 can be increased so that the refrigerant flow rate is increased. With an increased flow rate the amount of heat Qin and Qout1 over time can be increased.

The specific details of the specific aspects of the present invention may be combined in any suitable manner without departing from the spirit and scope of embodiments of the invention. However, other embodiments of the invention may be directed to specific embodiments relating to each individual aspects, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A method of extracting a solute using a dense gas solvent and recovering the dense gas solvent, the method comprising:

extracting a solute from a sample in an extraction chamber using a dense gas solvent, thereby creating a solvent/solute mixture;

transferring thermal energy to a solvent vaporization chamber containing the solvent/solute mixture;

maintaining an operating pressure of the solvent vaporization chamber to be within a prescribed operating range while allowing a temperature and pressure of the solvent/solute mixture in the extraction chamber to vary with an ambient temperature;

separating the dense gas solvent and the solute;

transferring thermal energy from a first solvent condensation chamber containing the dense gas solvent; and sending the dense gas solvent to the extraction chamber, wherein the thermal energy transferred to the solvent vaporization chamber is from a condenser of a heat pump, and wherein the thermal energy transferred from the first solvent condensation chamber is sent to an evaporator of the heat pump.

2. The method of claim 1, wherein the operating pressure of the solvent vaporization chamber is maintained using a device between the extraction chamber and the solvent vaporization chamber, wherein the device is operable to increase or decrease the pressure to be within the operating range.

3. The method of claim 2, when the device decreases the pressure form the extraction chamber, recovering energy performed as work during the expansion of the gas.

4. The method of claim 3, wherein the device is a pump, and wherein the energy is recovered when the expanding gas drives the pump's electric motor to generate electricity, thereby recovering at least some of the energy.

5. The method of claim 1, wherein transferring thermal energy to the solvent/solute mixture in the solvent vaporization chamber increases a solubility of the solute in the solvent.

6. The method of claim 1, further comprising:
subsequent to a refrigerant passing through the condenser of the heat pump, transferring energy from the refrigerant to an ambient environment via a heat exchanger.

7. The method of claim 1, wherein the condenser is configured to operate at a first temperature, and wherein the solvent/solute mixture reaches a second temperature in the solvent vaporization chamber, and wherein the evaporator is configured to operate at a third temperature.

8. The method of claim 7, further comprising:
subsequent to transferring thermal energy from the first solvent condensation chamber containing the dense gas solvent to the evaporator, increasing a pressure of the dense gas solvent to a first pressure value that provides saturation conditions corresponding to a current temperature of the extraction chamber; and modifying a pressure of the solvent/solute mixture extracted from the extraction chamber to obtain the maintained operating pressure of the solvent vaporization chamber, wherein the maintained operating pressure provides saturation conditions corresponding to the second temperature.

9. The method of claim 1 wherein the temperature difference between the solvent vaporization chamber and the first solvent condensation chamber is less than 15° C.

10. The method of claim 9, wherein the difference between the solvent vaporization chamber and the condenser is greater than 10° C., wherein the difference in temperature between the first solvent condensation chamber and the evaporator is greater than 10° C., and wherein the pressure change between the evaporator and the condenser is less than 3 bar.

11. The method of claim 1, wherein the dense gas solvent includes one or more substances selected from a group consisting of butane, propane, dimethyl ether, isobutane, pentane, ethane, carbon dioxide, iodotrifluoromethane, ammonia, nitrous oxide, and fluorocarbons.

12. The method of claim 1, wherein the dense gas solvent is dimethyl ether, butane, or propane.

13. The method of claim 1, wherein the dense gas solvent is a liquefied gas solvent.

14. A method of extracting a solute using a liquefied gas solvent and recovering the liquefied gas solvent, the method comprising:

extracting a solute from a sample in an extraction chamber using a dense gas solvent, thereby creating a solvent/solute mixture;

providing the solvent/solute mixture to an input of a solvent vaporization chamber, wherein the solvent/solute mixture is provided at temperature/pressure conditions that are above saturation conditions for the solvent;

heating the solvent/solute mixture in the solvent vaporization chamber;

sending the heated solvent/solute mixture through an expansion device, thereby converting substantially all of the liquefied gas solvent to a gas;

separating the gas and the solute;

cooling the gas in a first solvent condensation chamber, thereby at least partially condensing the gas; and sending the condensed gas to the extraction chamber, wherein heating in the solvent vaporization chamber and cooling in the first solvent condensation chamber uses a heat pump containing a refrigerant, the heat pump including:
(i) an evaporator that is thermally coupled with the first solvent condensation chamber evaporator;
(ii) a compressor fluidly coupled with the evaporator;
(iii) a condenser that is fluidly coupled with an output of the compressor and that is thermally coupled with the solvent vaporization chamber; and
(iv) a pressure reduction device fluidly coupled with an output of the condenser and fluidly coupled with an input of the evaporator.

15. The method of claim 14, further comprising:
increasing a pressure of the solvent/solute mixture output from the extraction chamber using a first pump device, thereby causing the solvent/solute mixture to be provided to the solvent vaporization chamber at temperature/pressure conditions that are above saturation conditions for the solvent.

16. The method of claim 14, wherein heating the solvent/solute mixture in the solvent vaporization chamber increases a solubility of the solute in the solvent.

17. The method of claim 16, wherein heating the solvent/solute mixture in the solvent vaporization chamber causes the solvent/solute mixture to reach a saturated state for the solvent.

* * * * *